(12) United States Patent
Wu

(10) Patent No.: US 8,743,804 B2
(45) Date of Patent: Jun. 3, 2014

(54) METHOD OF HANDLING SEMI-PERSISTENT SCHEDULING TRANSMISSION AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 97 days.

(21) Appl. No.: 13/115,987

(22) Filed: May 26, 2011

(65) Prior Publication Data

US 2011/0305210 A1 Dec. 15, 2011

Related U.S. Application Data

(60) Provisional application No. 61/353,229, filed on Jun. 10, 2010.

(51) Int. Cl.
*H04W 4/00* (2009.01)
(52) U.S. Cl.
USPC .......................................................... 370/329
(58) Field of Classification Search
None
See application file for complete search history.

(56) References Cited

U.S. PATENT DOCUMENTS

| 2010/0067457 A1* | 3/2010 | Wang et al. | 370/329 |
| 2010/0077100 A1* | 3/2010 | Hsu et al. | 709/234 |
| 2010/0150101 A1* | 6/2010 | Ahluwalia et al. | 370/330 |

FOREIGN PATENT DOCUMENTS

WO 2009022749 A2 2/2009

OTHER PUBLICATIONS

3GPP TS 36.321 v9.2.0, Mar. 2010.
3GPP TSG-RAN WG2 Meeting #70 R2-103427, Stage 2 description of Carrier Aggregation, May 2010.
European patent application No. 11004460.9, European Application filing date: May 31, 2010, European Search Report mailing date: Jan. 19, 2012.
VIA Telecom, "Overhead and Delay Reduction for UL Data Transfer in LTE Semi-Persistent Scheduling Operation", 3GPP TSG-RAN WG2 #67, R2-094516, Aug. 24-Jul. 28, 2009, Shenzhen, CN, XP050352661, p. 1-2.
European patent application No. 11004460.9, European Search Report mailing date: Sep. 6, 2011.
Panasonic, "Uplink grant processing order for carrier aggregation", 3GPP TSG-RAN WG2 Meeting #70, R2-102758, May 10-14, 2010, Montreal, Canada, XP050423031, p. 1-3.
Panasonic, "Semi-persistent scheduling operation in LTE Rel-9", 3GPP TSG RAN WG2 #66, R2-092865, May 4-8, 2009, San Francisco, USA, XP050340682, p. 1-2.
Alcatel-Lucent Shanghai Bell, Alcatel-Lucent, "Discussion on SPS related open issue", 3GPP TSG-RAN WG2 Meeting #70, R2-102878, May 10-14, 2010, Montreal, Canada, XP050423173, p. 1-3.
Panasonic, "Details of SPS operation for carrier aggregation", 3GPP TSG-RAN WG1 Meeting #60bis, R1-102014, 3GPP TSG-RAN WG2 Meeting #69bis, R2-102087, Apr. 12-16, 2010, Beijing, China, XP050419347, p. 1-3.
ETSI TS 136 321 V9.2.0 (Apr. 2010), "LTE; Evolved Universal Terrestrial Radio Access (E-UTRA); Medium Access Control (MAC) protocol specification (3GPP TS 36.321 version 9.2.0 Release 9)", XP014046909, p. 1-49.
Office action mailed on Nov. 20, 2013 for the Taiwan application No. 100119182, filing date Jun. 1, 2011, pp. 1-6.

* cited by examiner

*Primary Examiner* — Yong Zhou
(74) *Attorney, Agent, or Firm* — Winston Hsu; Scott Margo

(57) ABSTRACT

A method of handling Semi-Persistent Scheduling (SPS) transmission for a mobile device in a wireless communication system is disclosed. The mobile device has a dynamic grant and a configured grant for transmission in a subframe. The method comprises a step of transmitting a data in the subframe according to a usage status of the configured grant.

5 Claims, 5 Drawing Sheets

METHOD OF HANDLING SEMI-PERSISTENT SCHEDULING TRANSMISSION AND RELATED COMMUNICATION DEVICE

CROSS REFERENCE TO RELATED APPLICATIONS

This application claims the benefit of U.S. Provisional Application No. 61/353,229, filed on Jun. 10, 2010 and entitled "Method and Apparatus for Semi-Persistent Scheduling transmission in a wireless communication system", the contents of which are incorporated herein by reference.

BACKGROUND OF THE INVENTION

1. Field of the Invention

The present invention relates to a method used in a wireless communication system and related communication device, and more particularly, to a method of handling Semi-Persistent Scheduling (SPS) transmission in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as to user equipments (UEs).

The LTE system has two scheduling methods: dynamic scheduling (DS) and semi-persistent scheduling (SPS). For DS, the network dynamically allocates resources to UEs for data reception or transmission depending on traffic volume, quality of service (QoS) requirements of each UE. And for SPS, the network periodically allocates an SPS resource to UEs, in order to serve upper layer applications which generate semi-static size data periodically, e.g. Voice over Internet Protocol (VoIP) services, for reducing control information sent on a physical downlink control channel (PDCCH) and enhancing system scheduling performance. In other words, SPS provides semi-persistent transmission resources, i.e. configured UL grant, to the UE, such that the UE can perform periodic data transmission without receiving PDCCH.

A long term evolution-advanced (LTE-A) system, as its name implies, is an evolution of the LTE system. The LTE-A system targets faster switching between power states, improves performance at a cell edge, and includes subjects, such as bandwidth extension, coordinated multipoint transmission/reception (CoMP), UL multiple-input multiple-output (MIMO), etc.

For bandwidth extension, carrier aggregation is introduced to the LTE-A system by which two or more component carriers are aggregated to achieve a wider-band transmission. Accordingly, the LTE-A system can support a wider bandwidth up to 100 MHz by aggregating a maximum number of 5 component carriers, where bandwidth of each component carrier is 20 MHz and is backward compatible with 3GPP Rel-8. An LTE-A specification supports carrier aggregation for both continuous and non-continuous component carriers with each component carrier limited to a maximum of 110 resource blocks. The carrier aggregation increases a bandwidth flexibility by aggregating the non-continuous component carriers. A component carrier is used as an UL component carrier or a downlink (DL) component carrier. Further, there is a one-to-one correspondence between the UL component carrier and the DL component carrier, i.e., each UL component carrier is paired with a corresponding DL component carrier. In an LTE-A time-division duplex (TDD) system, the UL component carrier and DL component carrier are the same component carrier.

When the UE is configured with the carrier aggregation (CA), the UE is allowed to receive and transmit data on one or multiple component carriers to increase the data rate. In the LTE-A system, it is possible for the eNB to configure the UE different numbers of UL and DL component carriers which depend on UL and DL aggregation capabilities, respectively. Moreover, the component carriers configured to the UE necessarily consists of one DL primary component carrier (PCC) and one UL primary component carrier. Component carriers other than the primary component carriers are named UL or DL secondary component carriers (SCCs). The numbers of UL and DL secondary component carriers are arbitrary, and are related to the UE capability and available radio resource. The PCell can not be de-activated, but can be changed by a handover procedure with the RACH procedure. In carrier aggregation, the UE only has one RRC connection with the network. At RRC connection establishment/re-establishment/handover, one serving cell provides the NAS mobility information, and at RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

According to the specification released by 3rd Generation Partnership Project (3GPP), the UE shall clear the configured uplink grant immediately after implicitReleaseAfter [8] number of consecutive new medium access control (MAC) Protocol Data Units (PDUs) each containing zero MAC service data units (SDUs) have been provided by the Multiplexing and Assembly entity, on the Semi-Persistent Scheduling resource. As a result, the Semi-Persistent Scheduling resource can be released when the UE does not have data for transmission.

However, assume that the UE is configured with a primary component carrier, at least one secondary component carrier (i.e. corresponding to a PCell and at least a SCell, respectively), a Semi-Persistent Scheduling (SPS) resource on the primary component carrier and an implicitReleaseAfter value set to 2. In a first subframe (i.e. a transmission time interval (TTI)), the UE has a first dynamic grant and a first configured grant for transmission. The UE does not have enough data for uplink transmission using both the first dynamic grant and the first configured grant, so the UE transmits a first MAC PDU containing data using the first dynamic grant and a second MAC PDU containing no data (i.e. zero MAC SDUs) using the first configured grant. In a second subframe, the UE has a second dynamic grant and a second configured grant. The UE does not have enough data for uplink transmission using both the second dynamic grant and the second configured grant, so the UE transmits a third MAC PDU containing data using the second dynamic grant and a forth MAC PDU containing no data (i.e. zero MAC SDUs) using the second configured grant.

Under such a situation, since the UE transmits two consecutive MAC PDUs each containing zero MAC SDUs, the UE clears the Semi-Persistent Scheduling resource while the UE actually has data for transmission. Therefore, in carrier aggregation, since the UE may transmit data using dynamic grants rather than configured grants, it is more likely for the UE to transmit consecutive MAC PDUs each containing zero MAC SDUs using the configured grants and thus clear the Semi-Persistent Scheduling resource, which wastes PDCCH resources for frequent SPS activation due to frequent SPS implicitly deactivation.

SUMMARY OF THE INVENTION

The disclosure therefore provides a method and related communication device for handling Semi-Persistent Scheduling (SPS) transmission.

A method of handling Semi-Persistent Scheduling (SPS) transmission for a mobile device in a wireless communication system is disclosed. The mobile device has a dynamic grant and a configured grant for transmission in a subframe. The method comprises a step of transmitting a data in the subframe according to a usage status of the configured grant.

A method of handling Semi-Persistent Scheduling (SPS) transmission for a mobile device in a wireless communication system is disclosed. The mobile device has a plurality of configured grants and a plurality of dynamic grants for transmissions in a plurality of same subframes. The method comprises a step of not transmitting a number of consecutive medium access control (MAC) Protocol Data Units (PDUs) containing zero MAC service data units (SDUs) using the configured grants if there is a data required for transmission in the plurality of same subframes.

A method of handling Semi-Persistent Scheduling (SPS) transmission for a mobile device in a wireless communication system is disclosed. The method comprises a step of clearing a configured uplink grant if a first number of consecutive medium access control (MAC) Protocol Data Units (PDUs) each containing zero MAC service data units (SDUs) are provided on a Semi-Persistent Scheduling resource and a second number of consecutive MAC PDUs each containing zero MAC SDUs are provided on dynamic scheduling resources.

A communication device of a wireless communication system for handling Semi-Persistent Scheduling (SPS) transmission is disclosed. The communication device has a dynamic grant and a configured grant for transmission in a subframe, and comprises means for transmitting a data in the subframe according to a usage status of the configured grant.

A communication device of a wireless communication system for handling Semi-Persistent Scheduling (SPS) transmission is disclosed. The communication device has a plurality of configured grants and a plurality of dynamic grants for transmissions in a plurality of same subframes, and comprises means for not transmitting a number of consecutive medium access control (MAC) Protocol Data Units (PDUs) containing zero MAC service data units (SDUs) using the configured grants if there is a data required for transmission in the plurality of same subframes.

A communication device of a wireless communication system for handling Semi-Persistent Scheduling (SPS) transmission is disclosed. The communication device comprises means for clearing a configured uplink grant if a first number of consecutive medium access control (MAC) Protocol Data Units (PDUs) each containing zero MAC service data units (SDUs) are provided on a Semi-Persistent Scheduling resource and a second number of consecutive MAC PDUs each containing zero MAC SDUs are provided on dynamic scheduling resources.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
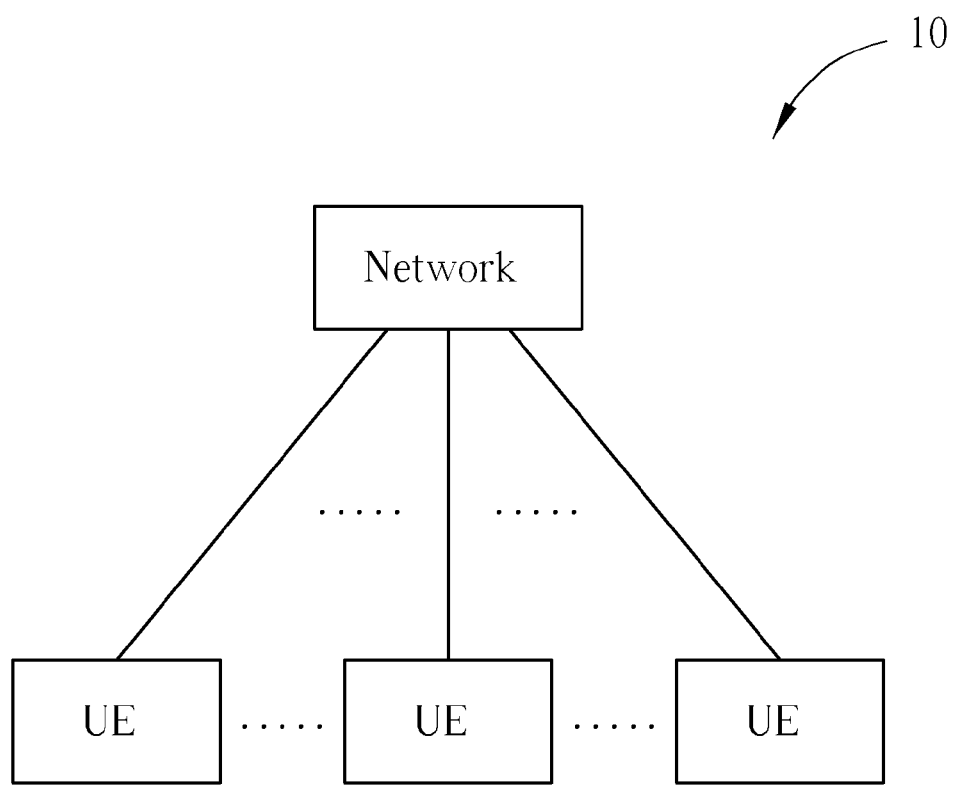
FIG. 1 is a schematic diagram of an exemplary wireless communication system.

Please refer to FIG. 1. FIG. 1 is a schematic diagram of an exemplary wireless communication system 10. The wireless communication system 10 can be an LTE-Advanced system, or other mobile communication systems (e.g. LTE, WCDMA, HSPA, GSM, EDGE, etc.). The wireless communication system 10 is briefly composed of a network and a plurality of user equipments (UEs), as the structure illustrated in FIG. 1. In the LTE-Advanced system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
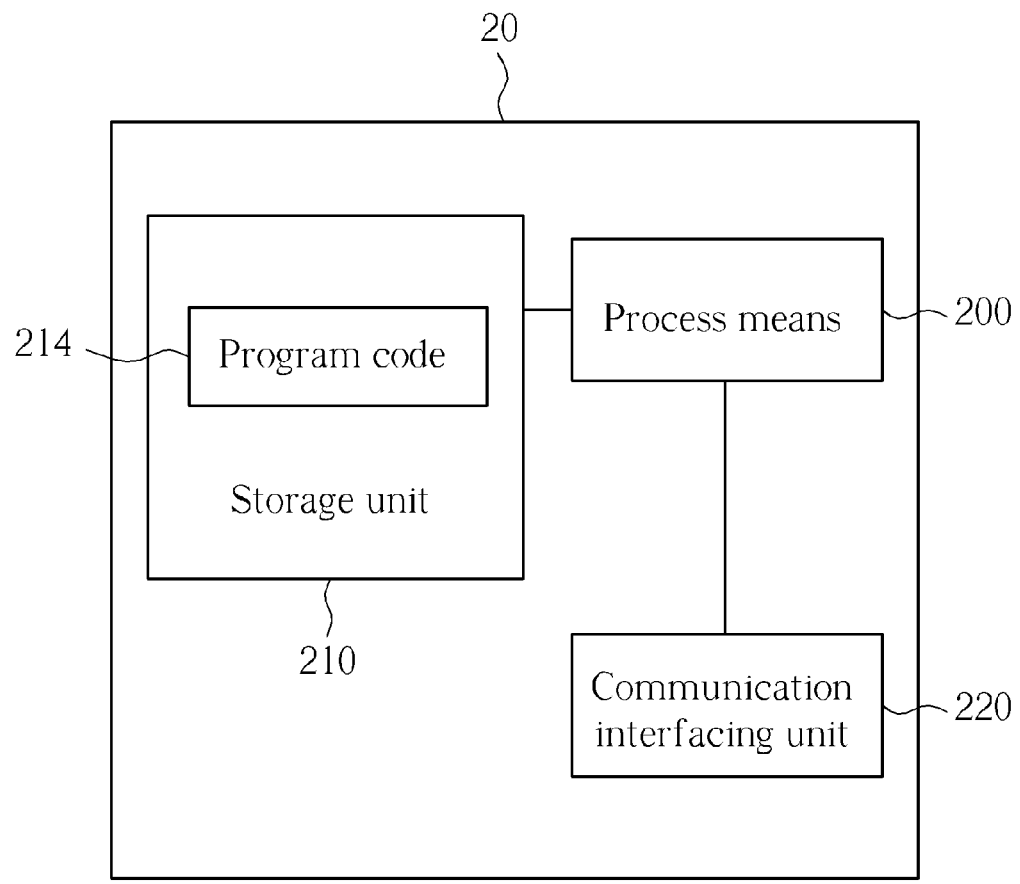
FIG. 2 is a schematic diagram of an exemplary communication device.

Please refer to FIG. 2. FIG. 2 is a schematic diagram of an exemplary communication device 20. The communication device 20 can be the UE or the network shown in FIG. 1 and may include a processing means 200 such as a microprocessor or ASIC, a memory unit 210, and a communication interfacing unit 220. The memory unit 210 may be any data storage device that can store program code 214 for access by the processing means 200. Examples of the memory unit 210 include but are not limited to a subscriber identity module (SIM), read-only memory (ROM), random-access memory (RAM), CD-ROMs, magnetic tapes, floppy disks, and optical data storage devices. The communication interfacing unit 220 is preferably a radio transceiver for wirelessly communicating with the network according to processing results of the processing means 200.

Figure 3:
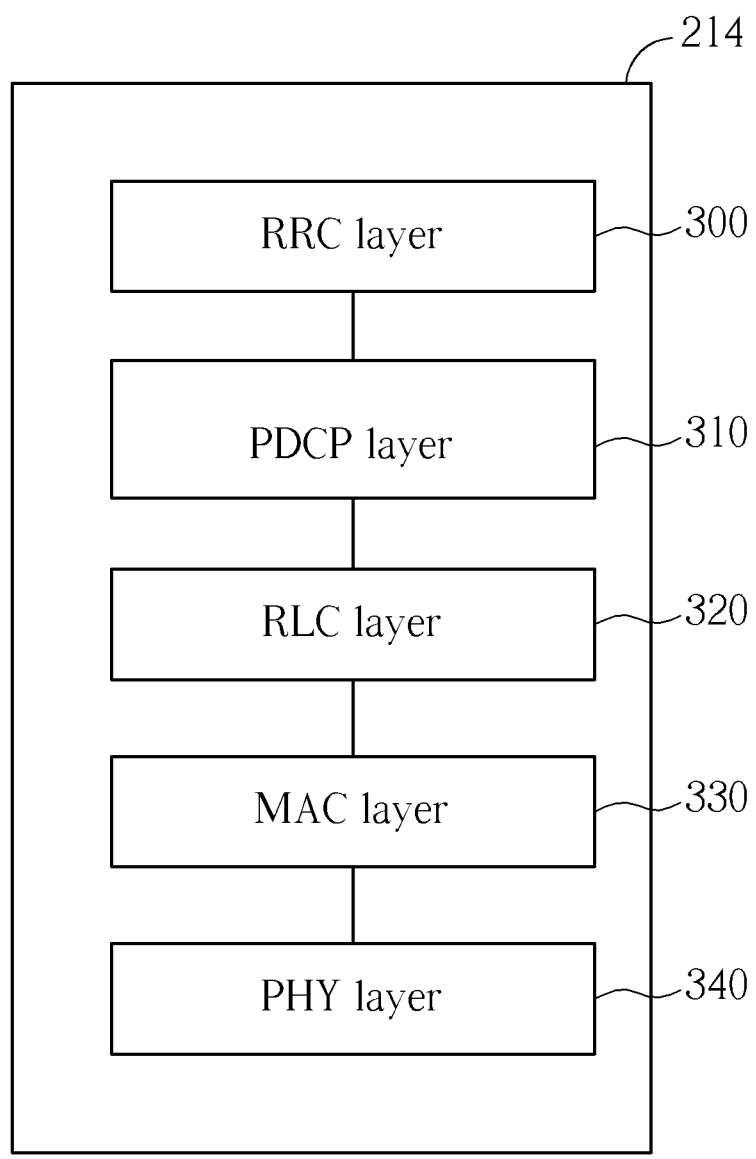
FIG. 3 illustrates the program code in FIG. 2.

Please refer to FIG. 3, which illustrates the program code 214 in FIG. 2. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340. The PHY layer 340 includes functions transmitting and receiving physical channels, such as Physical Random Access Channel (PRACH), Physical Uplink Control Channel (PUCCH), Physical Uplink Shared Channel (PUCCH), Physical Downlink Control Channel (PDCCH), Physical Downlink Shared Channel (PDCCH).

In LTE-A system, the PHY layer 340 and the MAC layer 330 may support a Carrier Aggregation (CA) technology, which enables the UE to perform data transmission and/or reception through one or multiple component carriers. In such a situation, the embodiments of the present invention provide the program code 214 for the UE to properly handle Semi-Persistent Scheduling (SPS) transmission, so as to save PDCCH resources by avoiding frequent SPS implicitly deactivation when the UE actually has data for transmission.

Figure 4:
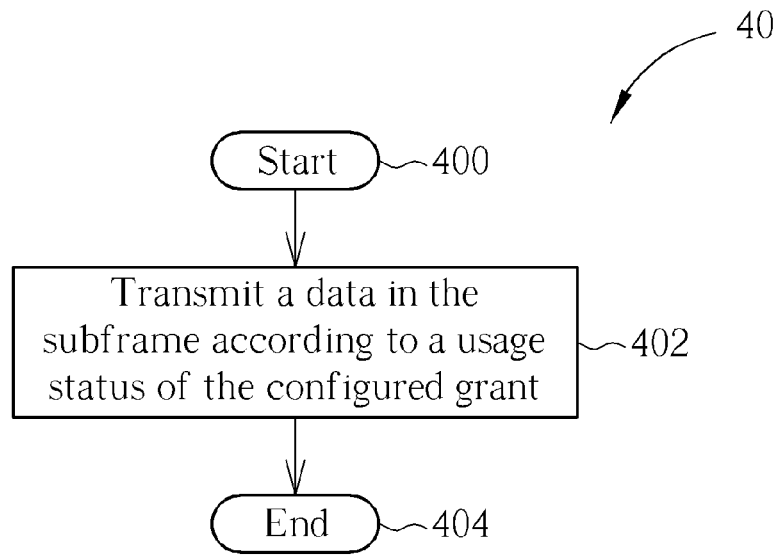
FIG. 4 is a flow chart of a process according to an embodiment of the present invention.

Please refer to FIG. 4, which is a flow chart of a process 40 according to an embodiment of the present invention. The process 40 is used for handling SPS transmission for a UE in a wireless communication system. The wireless communication system could be the wireless communication system 10, and the UE has a dynamic grant and a configured grant for transmission in a subframe. The process 40 can be compiled into the program code 214 and includes the following steps:

Step 400: Start.

Step 402: Transmit a data in the subframe according to a usage status of the configured grant.

Step 404: End.

According to the process 40, when the UE has a dynamic grant and a configured grant for transmission in a subframe and has data in a buffer for transmission in the subframe, the UE transmit the data in the subframe according to a usage status of the configured grant.

In detail, if the data can be transmitted using the configured grant, the UE transmits the data using the configured grant in the subframe. On the other hand, if the data can not be transmitted using the configured grant, the UE transmits the data using the dynamic grant in the subframe. In other words, when the UE has an amount of data for transmission using the configured grant and the dynamic grant, the UE transmits the amount of data using the configured grant first, and then transmits a rest of the amount of data using the dynamic grant if the amount of data is enough for transmission using both the configured grant and the dynamic grant. As a result, when the UE has data for transmission, the UE transmits data using the configured grant first, so as to save PDCCH resources by avoiding frequent SPS implicitly deactivation.

By applying the process 40 in the situation described in the prior art, i.e. two dynamic grants and two configured grants for transmissions in two subframes (i.e. transmission time intervals (TTIs)) and the implicitReleaseAfter value set to 2, the UE transmits a first MAC Protocol Data Unit (PDU) containing at least one MAC service data unit (SDU) using a first configured grant in a first subframe, and the UE may transmit a second MAC PDU containing at least one MAC SDU using a second configured grant in second first subframe. Therefore, when the UE has data for transmission, the UE can avoid frequent SPS implicitly deactivation by transmitting data using the configured grant first.

Figure 5:
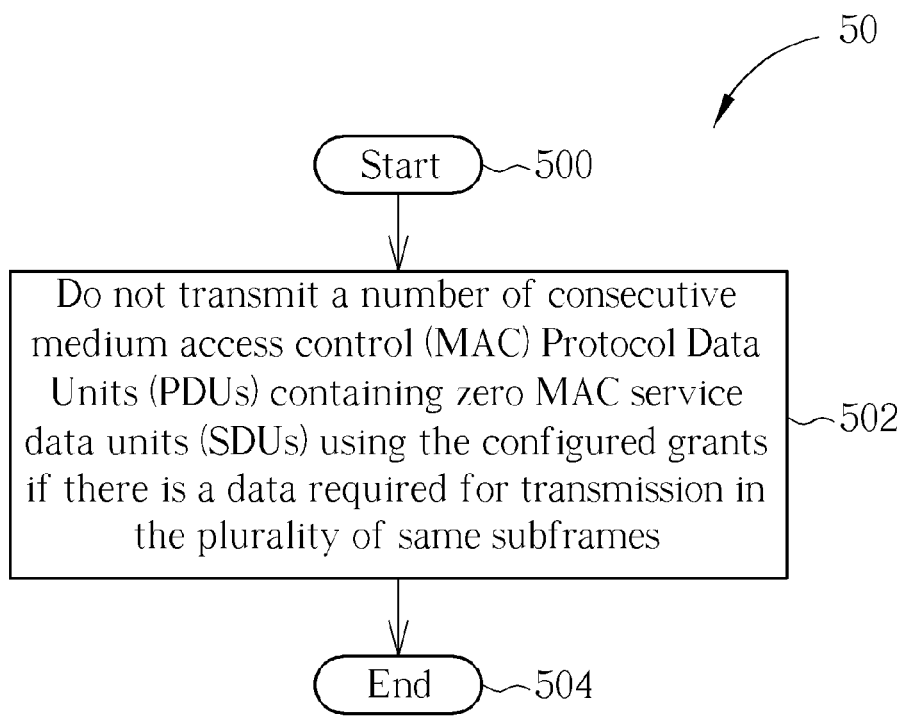
FIG. 5 is a flow chart of a process according to an embodiment of the present invention.

Please refer to FIG. 5, which is a flow chart of a process 50 according to an embodiment of the present invention. The process 50 is used for handling SPS transmission for a UE in a wireless communication system. The wireless communication system could be the wireless communication system 10, and the UE has a plurality of configured grants and a plurality of dynamic grants for transmissions in a plurality of same subframes. The process 50 can be compiled into the program code 214 and includes the following steps:

Step 500: Start.

Step 502: Do not transmit a number of consecutive medium access control (MAC) Protocol Data Units (PDUs) containing zero MAC service data units (SDUs) using the configured grants if there is a data required for transmission in the plurality of same subframes.

Step 504: End.

According to the process 50, when the UE has a plurality of configured grants and a plurality of dynamic grants for transmissions in a plurality of same subframes, and has a data in a buffer required for transmission in the plurality of same subframes, the UE does not transmit a number of consecutive MAC PDUs containing zero MAC SDUs using the configured grants, wherein the number of consecutive MAC PDUs is smaller than or equal to an implicitReleaseAfter value. As a result, when the UE has data for transmissions using the plurality of configured grants and the plurality of dynamic grants, the UE does not transmit an implicitReleaseAfter number of consecutive MAC PDUs containing zero MAC SDUs using the configured grants and thus does not clear the configured grant, so as to save PDCCH resources by avoiding frequent SPS implicitly deactivation.

By applying the process 50 in the situation described in the prior art, i.e. two dynamic grants and two configured grants for transmissions in two subframes and the implicitReleaseAfter value set to 2, the UE may transmit a first MAC PDU containing zero MAC SDUs using a first configured grant but transmit a second MAC PDU containing at least one MAC SDU using the second configured grant in one embodiment, or the UE may transmit the first MAC PDU containing at least one MAC SDU using the first configured grant but transmit the second MAC PDU containing zero MAC SDUs using the second configured grant in another embodiment. Therefore, when the UE has data for transmission, the UE can avoid frequent SPS implicitly deactivation by not transmitting an implicitReleaseAfter number of consecutive MAC PDUs containing zero MAC SDUs using the configured grants.

Figure 6:
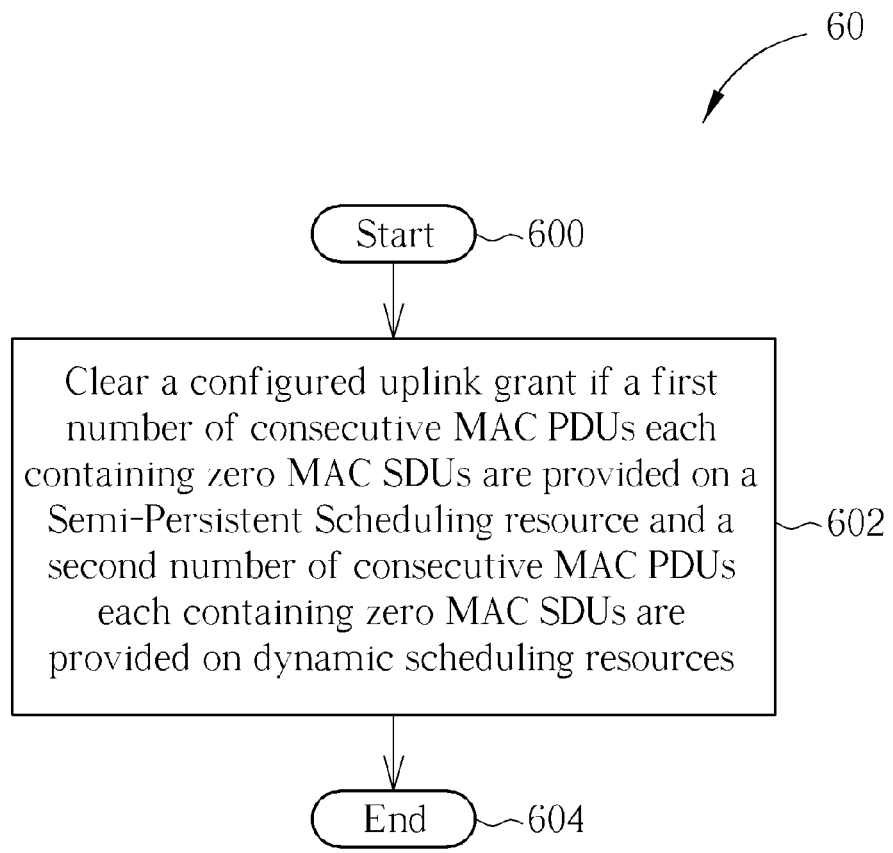
FIG. 6 is a flow chart of a process according to an embodiment of the present invention.

Please refer to FIG. 6, which is a flow chart of a process 60 according to an embodiment of the present invention. The process 50 is used for handling SPS transmission for a UE in a wireless communication system. The wireless communication system could be the wireless communication system 10. The process 60 can be compiled into the program code 214 and includes the following steps:

Step 600: Start.

Step 602: Clear a configured uplink grant if a first number of consecutive MAC PDUs each containing zero MAC SDUs are provided on a Semi-Persistent Scheduling resource and a second number of consecutive MAC PDUs each containing zero MAC SDUs are provided on dynamic scheduling resources.

Step 604: End.

According to the process 60, when the UE clears a configured uplink grant if a first number of consecutive medium access control (MAC) Protocol Data Units (PDUs) each containing zero MAC service data units (SDUs) are provided by a Multiplexing and Assembly entity, on a Semi-Persistent Scheduling resource and a second number of consecutive MAC PDUs each containing zero MAC SDUs are provided by the Multiplexing and Assembly entity, on dynamic scheduling resources, wherein the first number is same as the second number, e.g. an implicitReleaseAfter value, and the dynamic scheduling resources are allocated in a plurality of same subframes as the Semi-Persistent Scheduling resource.

In other words, other than meeting the conventional requirement that the implicitReleaseAfter number of consecutive MAC PDUs each containing zero MAC SDUs are provided on the on a Semi-Persistent Scheduling resource, a new requirement that the implicitReleaseAfter number of consecutive MAC PDUs each containing zero MAC SDUs are provided on the dynamic scheduling resources is needed to be met for the UE to clear the configured uplink grant. Noticeably, a network in the wireless communication system correspondingly considers the Semi-Persistent Scheduling resource is released if receiving the first number of consecutive MAC PDUs and the second number of consecutive MAC PDUs. As a result, the UE clears the configured uplink grant when transmitting the implicitReleaseAfter number of consecutive MAC PDUs each containing zero MAC SDUs on both the and Semi-Persistent Scheduling resource and the dynamic scheduling resources, so as to save PDCCH resources by avoiding frequent SPS implicitly deactivation.

By applying the process 60 in the situation described in the prior art, i.e. two dynamic grants and two configured grants for transmissions in two subframes and the implicitReleaseAfter value set to 2, the UE does not clear the configured uplink grant since the UE does not transmit two consecutive MAC PDUs each containing zero MAC SDUs on both and the and Semi-Persistent Scheduling resource the dynamic scheduling resources.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 200 processes the program code 214 related to the abovementioned processes and the processed results can enhance uplink transmission in the wireless communications system 10.

In the prior art, in carrier aggregation, since the UE may transmit data using dynamic grants rather than configured grants, it is more likely for the UE to transmit consecutive MAC PDUs each containing zero MAC SDUs using the configured grants and thus clear the Semi-Persistent Scheduling resource, which wastes PDCCH resources for frequent SPS activation due to frequent SPS implicitly deactivation.

In comparison, in order to save PDCCH resources by avoiding frequent SPS implicitly deactivation, in an embodiment of the present invention, when the UE has data for transmission, the UE transmits data using the configured grant first; in anther embodiment of the present invention, when the UE has data for transmissions using the plurality of configured grants and the plurality of dynamic grants, the UE does not transmit an implicitReleaseAfter number of consecutive MAC PDUs containing zero MAC SDUs using the configured grants and thus does not clear the configured grant; in a further embodiment of the present invention, the UE clears the configured uplink grant when transmitting the implicitReleaseAfter number of consecutive MAC PDUs each containing zero MAC SDUs on both the and Semi-Persistent Scheduling resource and the dynamic scheduling resources.

To sum up, the present invention can properly handle Semi-Persistent Scheduling transmission, so as to save PDCCH resources by avoiding frequent SPS implicitly deactivation when the UE actually has data for transmission.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling Semi-Persistent Scheduling (SPS) transmission for a mobile device in a wireless communication system, the method comprising:
   not transmitting a number of consecutive medium access control (MAC) Protocol Data Units (PDUs) containing zero MAC service data units (SDUs) using a plurality of configured grants if there is a data required for transmission in a plurality of same subframes;
   wherein the mobile device has the plurality of configured grants and a plurality of dynamic grants for transmissions in the plurality of same subframes.

2. The method of claim 1, wherein the number of consecutive MAC PDUs is smaller than or equal to an implicitReleaseAfter value.

3. A method of handling Semi-Persistent Scheduling (SPS) transmission for a mobile device in a wireless communication system, the method comprising:
   clearing a configured uplink grant if a first number of consecutive medium access control (MAC) Protocol Data Units (PDUs) each containing zero MAC service data units (SDUs) are provided on a Semi-Persistent Scheduling resource and a second number of consecutive MAC PDUs each containing zero MAC SDUs are provided on dynamic scheduling resources.

4. The method of claim 3, wherein the first number is same as the second number, and the dynamic scheduling resources are allocated in a plurality of same subframes as the Semi-Persistent Scheduling resource.

5. The method of claim 3, wherein a network in the wireless communication system considers the Semi-Persistent Scheduling resource is released if receiving the first number of consecutive MAC PDUs and the second number of consecutive MAC PDUs.

* * * * *